Jan. 19, 1937.  D. J. PRIEFERT  2,068,303
CULTIVATOR
Filed July 31, 1936    2 Sheets-Sheet 1

Dale J. Priefert, INVENTOR

BY Victor J. Evans & Co.
ATTORNEYS

Jan. 19, 1937. D. J. PRIEFERT 2,068,303
CULTIVATOR
Filed July 31, 1936 2 Sheets-Sheet 2
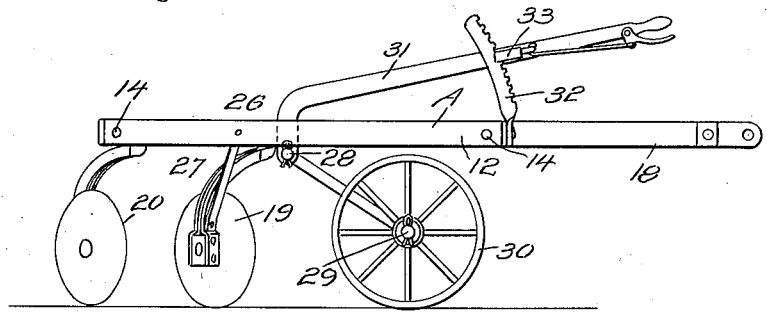
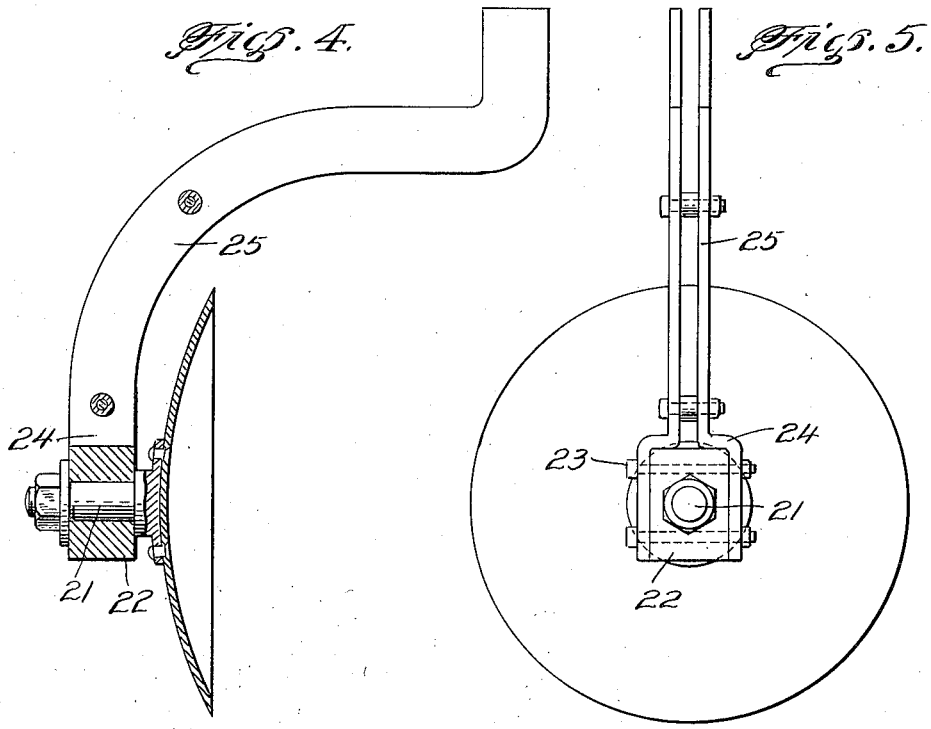
Dale J. Priefert,
INVENTOR
BY Victor J. Evans & Co.
ATTORNEYS Patented Jan. 19, 1937

2,068,303

UNITED STATES PATENT OFFICE 2,068,303

CULTIVATOR

Dale J. Priefert, Haswell, Colo.

Application July 31, 1936, Serial No. 93,730

1 Claim. (Cl. 97—53)

The invention relates to a cultivator and more especially to a disk lister cultivator.

The primary object of the invention is the provision of a cultivator of this character, wherein the construction thereof renders the same light in draft and in the advancement of such cultivator the said disks open the furrow and the rear disks render the said furrow deeper and wider, the cultivator being of novel construction in its entirety and is readily and easily adjusted to regulate the depth of the open furrow.

Another object of the invention is the provision of a cultivator of this character, wherein the ground wheels are mounted in a novel manner and are susceptible of adjustment to regulate the depth of cutting action for the opening of furrows in soil and also will enable the opening of a plurality of furrows during the advancement of the machine.

A further object of the invention is the provision of a cultivator of this character, which is simple in its construction, thoroughly reliable and effective in its operation, positive in action, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 3 is a side elevation.

Figure 4 is an enlarged fragmentary elevation partly in section through one of the disks.

Figure 5 is an end view thereof.

Similar reference characters indicate corresponding parts throughout the several views in the drawings.

Figure 1:
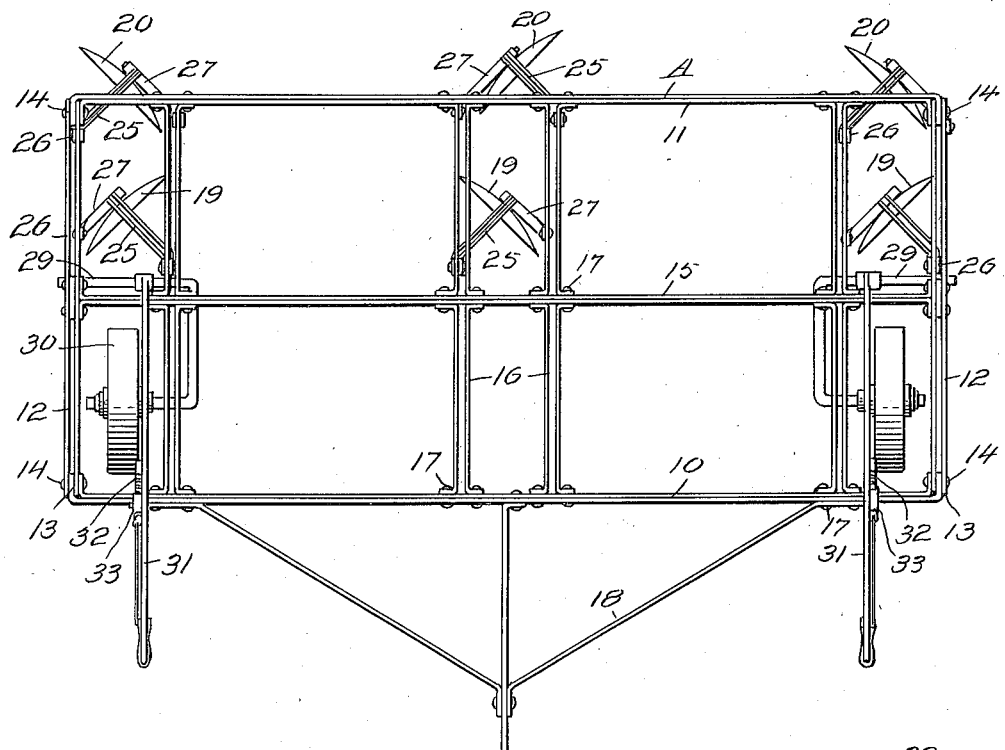
Figure 1 is a top plan view of a cultivator constructed in accordance with the invention.
Figure 2:
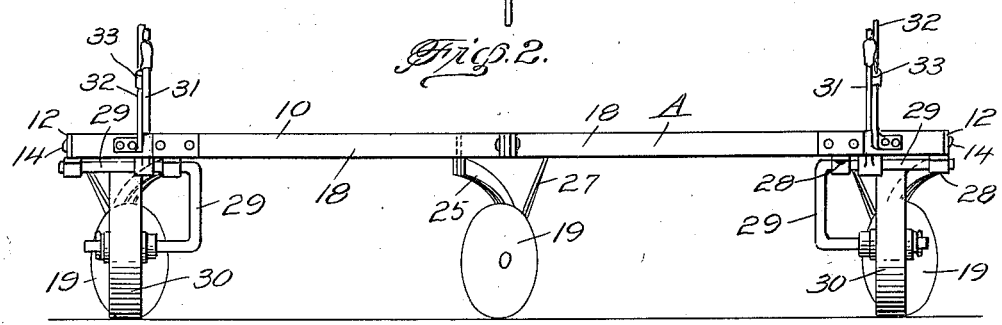
Figure 2 is a front elevation.

Referring to the drawings in detail, the cultivator comprises a main frame A made from strap metal and includes front and rear double bars 10 and 11 and double end bars 12, respectively, these bars being overlapped at their meeting ends as at 13 and are riveted at 14 together. The frame A is preferably of rectangular shape and has formed within the same a medial longitudinal brace 15 and cross braces 16, respectively, these being riveted at 17 to the frame proper. The cross braces 16 are spaced from each other and disposed in parallel relation one to the other they being preferably made of double strap metal. Fixed to the front bar 10 of the frame A is a draft rigging 18.

Supported by the frame 10 preferably at the rear half thereof are spaced front and rear revolving disks 19 and 20, respectively, these being dished and are disposed at reverse angles to each other with the concaved or dished sides foremost. Each disk 19 and 20 is centrally fixed to a stud axle 21 journaled in a block-like hub 22 bolted or otherwise secured at 23 to outset portions 24 of downwardly and laterally curved hangers 25, these being riveted at 26 to the frame A. Coacting with the hangers 25 are braces 27 which are riveted thereto and also to the frame.

Forwardly of the front disk 19 and journaled in bearings 28 are cranked axles 29 on which are journaled ground wheels 30. These axles 29 have fixed thereto raising and lowering levers 31, the wheels 30 being disposed next to opposite ends of the frame A and, as previously stated, are forwardly of the gang of disks 19 and 20 for traveling on the unbroken soil in the draft of the cultivator.

On the frame A next to the levers 31 are toothed keepers 32 with which engage latches 33 on the said levers 31 and these latches are spring latched and hand releasable so that by adjustment of the levers 31 the wheels 30 can be regulated to control the depth of cut of the disks 19 and 20 for furrow opening in the soil.

In the use of the cultivator the forward disks 19 open furrows in the soil while the rearmost disks 20 cut such open furrows deeper and wider during the advancement of said cultivator.

What is claimed is:

A cultivator of the character described comprising a frame, cranked axles journaled on the frame at opposite ends thereof, ground wheels rotatably supported by said axles, levers connected with the axles for raising and lowering the same, means for latching the levers in adjusted position, stationary hangers depending from said frame rearwardly of the axles, reversely angled rotatable disks journaled in said hangers, and double bars constituting said hangers and having block-like hubs fixed therein for axles of said disks.

DALE J. PRIEFERT.